Figure 4:
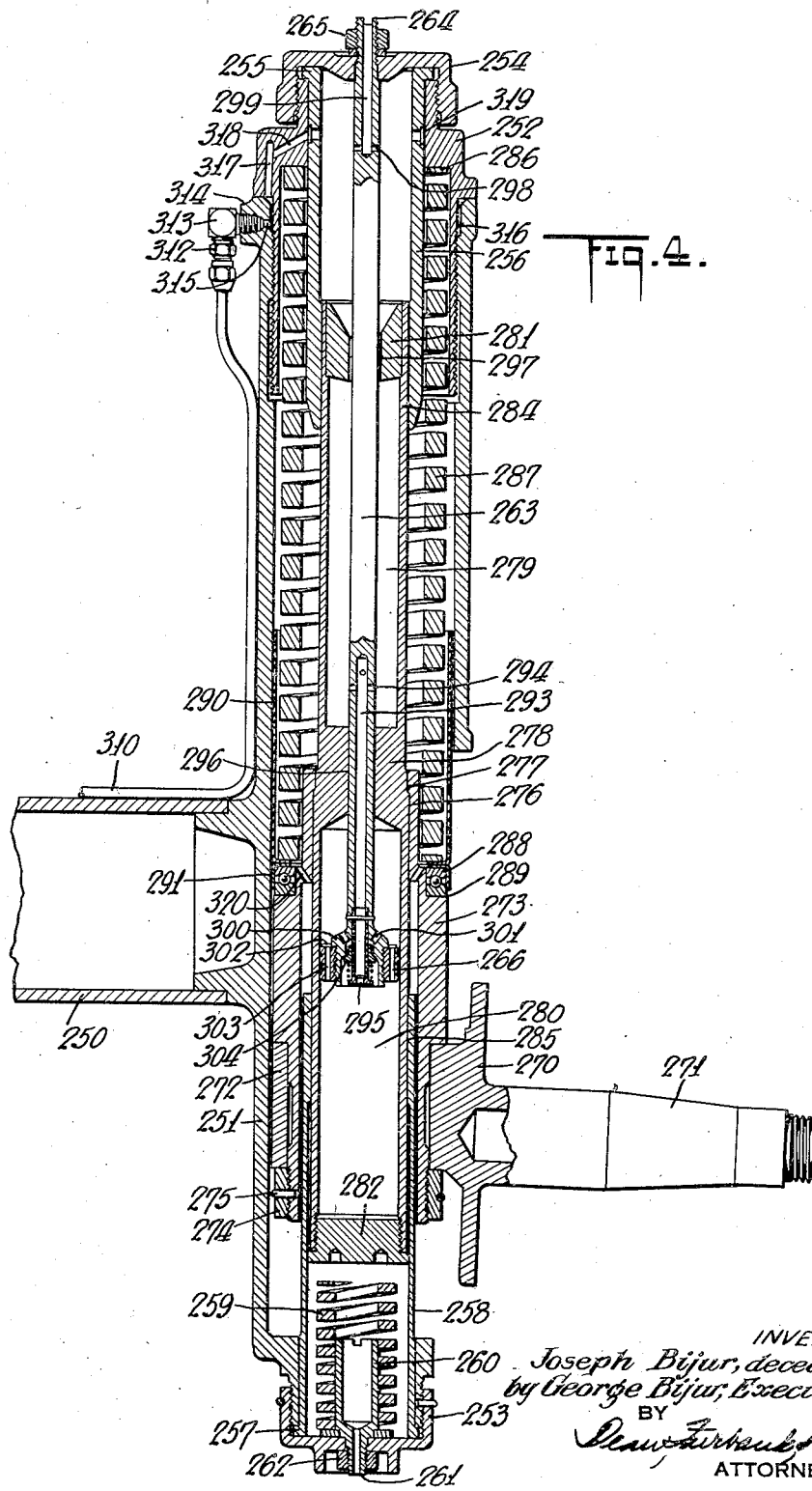

Jan. 14, 1936. J. BIJUR 2,027,366
CENTRAL LUBRICATION
Filed June 7, 1932 2 Sheets-Sheet 1
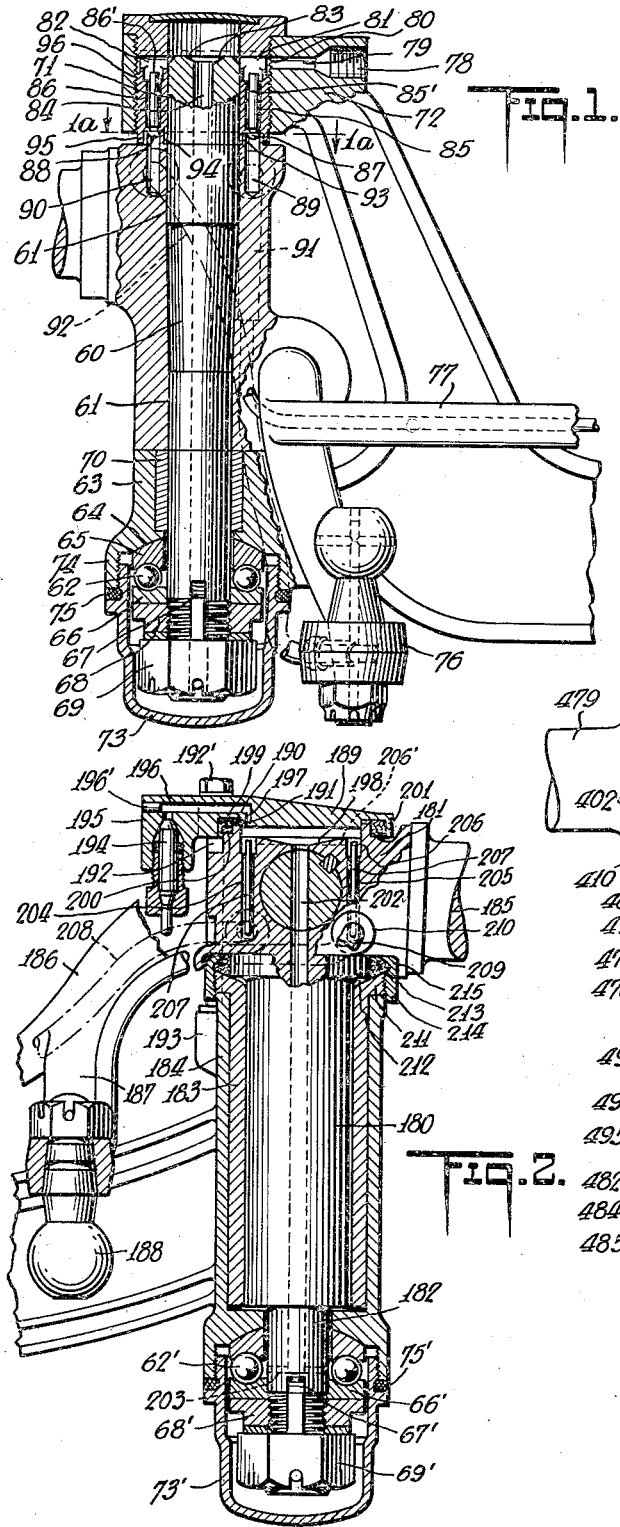
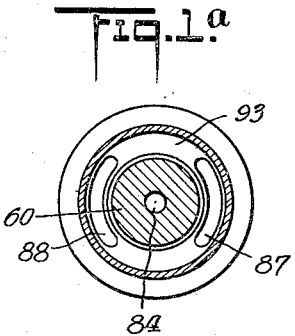
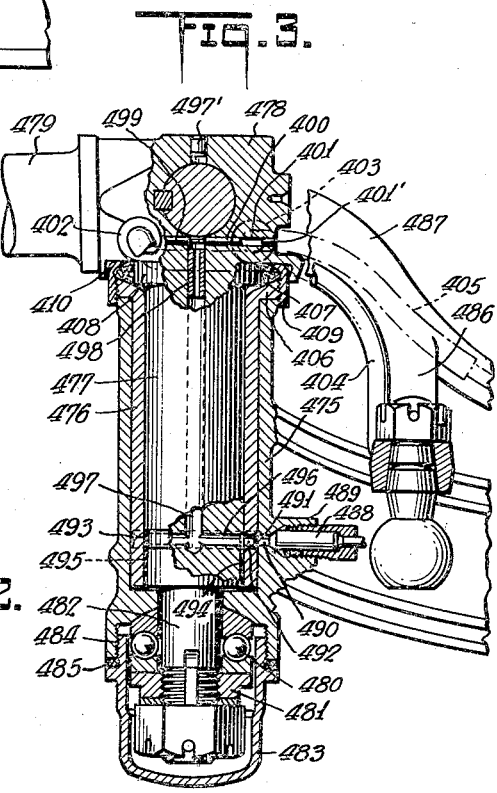
INVENTOR
Joseph Bijur, Deceased
by George Bijur, Executor
BY
Dean Fairbank Hirsch & Foster
ATTORNEYS Patented Jan. 14, 1936

2,027,366

UNITED STATES PATENT OFFICE 2,027,366

CENTRAL LUBRICATION

Joseph Bijur, deceased, late of New York, N. Y., by George Bijur, executor, New York, N. Y., assignor to Auto Research Corporation, a corporation of Delaware Application June 7, 1932, Serial No. 615,797

23 Claims. (Cl. 184—7)

The present invention relates to lubricant and oil flow systems and has a preferred application in association with central pressure lubricating systems, particularly where it is desired to deliver lubricant by gravity flow from a pressure line to oil receiving members, receptacles or bearings, of a structure having a swivel or other relatively movable connection to the structure carrying the pressure line.

The present invention has particular application to the supply of oil and lubricant to a chassis element which contain lubricant receptacles provided with relatively reciprocating and/or rotating members and which also carries or has associated with it a plurality of bearings which are also to receive lubricant. These bearings usually include one or more king pin pivotal mount and thrust bearings, and also in some instances the brake and the drag link and tie rod bearings, which latter serve as a means of connection for actuating members which tend to rotate the knuckle in such pivotal bearings.

An object of the present invention is to provide a lubricating installation for a chassis element or knuckle structure of the character described in which assurance will be had that all of the bearings and receptacles will be supplied with lubricant without the need for conveying lubricant under pressure across any of the pivotal or swivel bearings, or for selective manipulation, and without the use of auxiliary swivels or flapping conducts or other parts likely to become damaged in use.

Other objects are in part obvious and in part pointed out hereinafter.

In one type of construction to which the present invention is particularly applicable, a tubular member is connected to a supporting member or axle extending from the chassis frame and within this tubular member is located the king pin or pivot mount for the knuckle structure, the knuckle spindle and the drag link and tie rod bearings extending away from and being positioned a substantial distance from the pivotal bearings.

The inlet or supply conduit preferably extends along this supporting member or axle structure and is provided adjacent the pivotal bearing with a flow controlling outlet, such as a drip plug or measuring valve, which is connected to a central source of lubricant supply or pressure supported at some convenient position upon the chassis structure or the body of the automobile.

Adjacent the lower part of the pivotal mount is provided a receptacle to receive lubricant or oil. The pivotal mount preferably contains a plurality of relatively moving elements, and it is among the objects of the present invention to assure a supply of lubricant to such receptacle without at the same time depriving the pivotal bearings and/or the tie rod and drag link bearings of an adequate lubricant supply.

When the drag link and tie rod bearings are also supplied by gravity from the lubricant inlet adjacent the pivotal mount, a suitable branched inlet dividing fitting may be positioned upon the knuckle but most desirably suitable dividing passages are provided in the pivotal mount or in the knuckle structure adjacent said pivotal mount for assuring proper proportioning of lubricant between said bearings. The conduits to said drag link and tie rod bearings are preferably so arranged in construction so that there will be no liability of stanching, of air blocking, and/or of siphoning as between any of said bearings at different levels.

In the accompanying drawings in which are shown several of the various possible embodiments of the present invention, Figs. 1 and 1a show one embodiment, Fig. 1 being a side view partly in section, and Fig. 1a being a detailed sectional view taken on the lines 1a—1a of Fig. 1, Fig. 2 is a view similar to Fig. 1 of another embodiment, Fig. 3 is a view similar to Fig. 1 of another embodiment, and Fig. 4 is a view similar to Fig. 1 of another embodiment.

In Figs. 1 and 1a, the knuckle has a king pin 60 taper fitted thereinto as at 61 to sustain the tension due to the weight of the axle upon a thrust bearing 62 therefor, carried on the lower end of the king pin. For this purpose the lower clevis jaw 63 of the axle is provided with a spherical socket 64 in which fits the corresponding upper race 65 of the ball bearing, the lower race 66 of which is held against rotation by a key 67 fixed in a corresponding groove in the king pin 60. A nut 68 is threaded upon the lower end of the king pin and is retained in locked position by a lock nut 69. The king pin performs its pivoting rocking action in a bushing 70 fixed in the lower clevis jaw immediately above the thrust bearing. The upper end of the king pin bears in a bushing 71 in the upper clevis jaw 72 of the axle.

The thrust bearing is rendered proof against loss of oil by enclosing the same in a cap 73 threaded into a corresponding socket 74 formed in the lower end of the axle clevis and rendered dust-tight by an interposed gasket 75. The knuckle is shown with a tie rod bearing arm 76 and a drag link bearing arm 77.

To supply lubricant to the knuckle, an inlet socket 78 at the upper axle clevis jaw is provided for carrying a drip plug (not shown), or other appropriate lubricant inlet device, which may derive its lubricant from the frame, and delivering through a bore 79 in the axle to a groove 80 peripherally about the bushing 71 which in turn delivers through radial bores 81 and 82 to the upper king pin bearing in the bushing 71 and to the upper end of the king pin. The upper end of the king pin is formed as a crater 83 to drain lubricant into and through an axial bore 84 extending the entire length thereof, and emptying into the cup 73 for the thrust bearing. Lubricant also passes from the radial bores 81 and 82 respectively through longitudinal bores 85 and 86 in the upper bushing which drain into corresponding troughs 87 and 88 in the upper face of the knuckle, said troughs being arcuate to register with the bores 85 and 86 respectively for all positions of steering adjustment of the knuckle. The arcuate grooves drain into short bores 89 and 90 respectively drilled from the upper face of the knuckle which in turn drain respectively to conduits 91 and 92 leading respectively to the tie rod and drag link bearings.

In order to avoid entry of dirt or other foreign matter at the relatively loose crack or swivel between the upper clevis jaw and the knuckle, across which the lubricant passes, the knuckle is formed with an upstanding annular flange 93 unitary therewith in which the arcuate grooves 87 and 88 are formed, said flange extending into a corresponding annular groove in the lower face of the bushing 71 which accordingly has an inner ring portion 94 encircled by the inner face of the flange 93 and an outer ring portion 95 encircling the outer face of the knuckle flange. Inasmuch as it would be impossible to insert the knuckle between the jaws of the clevis were the rings 94 and 95 initially an integral part of the axle, these rings are preferably provided as an integral part of the bushing 71 which is threaded as at 96 into the upper clevis jaw. Accordingly, in assembly, the knuckle is first placed in position between the jaws of the clevis before the bushing 71 is completely inserted and only then is it threaded home, to permit its flange to protrude beyond the axle clevis in the manner shown.

In operation, lubricant admitted through the drip plug will pass about the groove 80 some passing inward through bores 81 and 82 to the king pin crater 83 from which it drains through the bore 84 to the thrust bearing well 73. Preferably the bores 85 and 86 are restricted so that only a small part of the lubricant passes to the tie rod and drag link bearings, and the bulk would enter the king pin bore 84. If desired, the restrictions may be formed by inserting pins 85' and 86' in the respective bores 85 and 86, and maintaining them in place by staking the lower ends of said bores. After the thrust bearing receptacle has thus been completely filled, all lubricant thereafter admitted through the drip plug would divide between the bores 85 and 86 and feed across the passage rendered dust proof by the encircling rings 94 and 95 into the knuckle bores 89 and 90 that deliver to the pipes 91 and 92 which supply the tie rod and drag link bearings. The thrust bearing would receive renewal oil only to supply the oil therein as it was used.

In Fig. 2 he has shown another embodiment of the invention including a thrust bearing 62' identical in construction with that shown in Fig. 1, corresponding parts designated by the same reference numerals primed. In this embodiment instead of the king pin shown in Fig. 1, he has provided a king pin stud 180 formed as an integral part of the knuckle upon the reduced end 182 of which pivot stud the thrust bearing is sustained. The stud bears in a bushing 183 press fitted into a corresponding socket 184 of substantial length formed as an integral part of the axle immediately above the thrust bearing chamber 73'. The wheel spindle 185 extends above the knuckle as does the knuckle body 181 from which there extend the tie rod arm 186 and a drag link arm 187 provided with ball studs, the latter of which shown at 188 extends downward and the former of which is not shown.

To lubricate the various bearings described, he has in this embodiment provided an inlet cap 189 having an annular groove 190 enclosing the upstanding flange 191 provided on the knuckle, said cap supported by a long stud 192 therethrough threaded at its lower end into an integral lug 193 on the axle socket 184 and secured by nut 192' on the upper end of said stud. Lubricant may be admitted through a drip plug 194 lodged in a lug 195 in the lower face of the cap 189, and feeding through a bore 196 in said cap plugged as at 196' at its outer end and draining through a nozzle 197 preferably near the rim of a countersink or well 198 formed in the upper face of the knuckle. To render the construction substantially proof against entry of dust or other foreign particles, an annular gasket 199 is housed in the cover member and pressed thereby against a corresponding shoulder 200 on the knuckle, the cap having a wall 201 snugly encircling the outer periphery of the gasket and extending therebelow as shown. The countersink 198 drains at its center through a bore 202 of substantial diameter, extending substantially the entire height of the pivot stud and terminating at substantially the level of the ball thrust bearing 62' which is supplied from said bore through radial bores 203 in the pivot stud.

Lubricant is also delivered from near the periphery of the countersink 198 to the tie rod and drag link bearings through smaller vertical bores 204 and 205 enlarged as at 206 at their upper ends and connected by a peripheral groove 206' to more readily intercept some of the lubricant, and carrying pins 207 therein, as shown, of but slightly less diameter than the bores 204 and 205 to afford restricted passageways. Pipes 208 and 209 respectively are affixed by appropriate terminals 210 to the lower ends of the restricted passages 204 and 205, said pipes extending respectively along the structure of the arms 186 and 187 to supply the respective bearings. It will be seen that the lubricant will tend more readily, in the construction disclosed, to flow through the axial king pin bore than through the restricted passages 205 and 206 until the thrust bearing receptacle is completely filled, as well as the king pin bore which occurs after a short interval of use, since the thrust bearing well is leak proof.

To avoid overflow of lubricant that has risen from the thrust bearing throughout the height of the bushing 183 and to preclude the entry of dirt or dust, at the upper open crack or swivel between the axle socket 184 and the knuckle, he provides the dust-proofing construction shown, according to which the bushing 183 is provided with an integral flange 211 resting upon the upper edge of the socket 133 upon which is superposed a flange 212 formed on the pivot stud, said flange encircled by a gasket 213 enclosed by a screw cap 214 threaded upon the bushing flange and exerting compression at its inturned upper flange 215 upon the gasket.

In the embodiment of Fig. 3 is shown a construction in which generic principles heretofore disclosed are applied to a different type of knuckle. In this case the axle is provided with an elongated bearing socket 475 within which is friction fitted a long bushing 476 affording a bearing for the pivot stud 477 formed integral with a knuckle, the body 478 of which extends above the axle as does the wheel spindle 479. The axle is sustained upon the knuckle by a thrust bearing 480 secured by a nut 481 upon the lower reduced end 482 of the pivot stud. The thrust bearing is enclosed in a dust-tight liquid-tight casing formed by threading an enclosing cap 483 into a corresponding socket 484 at the lower end of the axle and tightening thereby an interposed dust proofing gasket 485. The knuckle is provided rigid therewith with a tie rod arm 486 and in the case of the knuckle shown connected to the steering gear, also with a drag link arm 487 both protruding from the upper or body end thereof.

To lubricate the various bearings of and associated with the knuckle, he has provided a drip plug inlet 488 lodged in a corresponding boss 489 in the axle adjacent the pivot stud 477 which drip plug may be supplied from a remote source on the frame. The drip plug feeds through a bore 490 in the boss to a peripheral groove 491 at the exterior of the bushing 476 which in turn feeds through one or more apertures 492 in the bushing to a peripheral groove 493 about the pivot stud. Two or more longitudinal grooves 494 and 495 communicate from the peripheral groove 493 to the thrust bearing chamber therebelow. The peripheral groove 493 also communicates through one or more radial bores 496 in the stud with an axial bore 497 extending from the upper end of the knuckle body downward to said radial bore, the bore being plugged at 497' at its upper end. A pair of restriction pins 499 and 400 are provided leaving small clearance in a corresponding bore 401 which extends horizontally from opposite sides of the bore 497 said bore plugged at its outer end at 401'. The opposite ends of the bore 401 lead respectively to pipe terminals 402 and 403 from which the tie rod and drag link bearings are respectively supplied through corresponding pipes 404 and 405 on the knuckle.

In operation, when pressure is applied at the source, lubricant through the drip plug 488 will pass through bore 490, peripheral groove 491, aperture 492, and peripheral groove 493 and will drain through one of longitudinal grooves 494 or 495 into the thrust bearing socket, while venting of air from the thrust bearing receptacle occurs through the other of the longitudinal grooves.

After the thrust bearing well is completely charged, lubricant thereafter admitted through the drip plug will pass through radial bore 496 in the pivot stud and fill up the axial bore 497 whence it spreads in opposite directions from the upper end thereof for flow division controlled by restriction passages 499 and 400 to the tie rod and drag link bearings respectively.

The connection between the upper end of the axle socket and the knuckle is preferably rendered dustproof. The upper end of the bushing 476 is provided with a flange 406 resting on the socket 475 upon which is supported an annular felt gasket 407 tightly pressed about the integral flange 408 at the upper end of the pivot stud. The construction is maintained assembled by a cap 409 encircling the bushing flange and threaded thereover and having an inturned flange 410 exerting compression upon the felt annulus 407.

To reduce to a minimum, any leak through the gasket, of lubricant remaining in the oil passage thereabove, the effective volume of such passage is reduced by plugging the bore 497 at the part above the gasket with a sleeve 498 having a small bore therein, said sleeve preferably extending across the junction between the rim of the axle socket and the knuckle.

In Fig. 4 is shown a front steering knuckle design particularly adapted for independent wheel suspension in which a shock absorber receiving lubricant from the central system is incorporated in the pivotal structure.

In Fig. 4 the frame member or axle 250 carries a vertical tubular member 251 to the top of which is threaded the nipple member 252 and to the bottom of which is threaded the cup member 253. A cup member 254 is also threaded to the top of the member 252. Between the tube 251 and the cap member 254 is clamped the rim 255 of the depending upper bearing sleeve 256. Similarly clamped between the lower cup-shaped member 253 and the vertical tubular member 251 is the rim 257 of the upwardly extending lower bearing sleeve 258. Inside of the lower bearing sleeve 258 is positioned the thrust member including a coil spring 259 which is held in position by means of the tube 260, the nipple 261 of which projects downwardly through the bottom of the cup 253 and is held in position by the nut 262.

A shock absorber piston rod 263 projects downwardly through the assemblage axially inside of the tube 251 and at its upper end is threaded at 264 to receive the nut 265 which holds it in position on top of the cap 254 and its lower end is provided with a piston and valve assembly 266 which will be subsequently described. All of the members thus described move with and are substantially fixed in respect to the axle or frame member 250 which is suitably attached to the chassis or body of the automobile.

The steering knuckle 270 is provided with a spindle 271 and has an eye portion 272 which is tightly held on to the tubular member 273 by means of the nut 274 which is locked in position by the wire 275. The upper end 276 of the sleeve 273 is of decreased diameter and is pressed on or closely fitted to a shoulder 277 on the king pin or pivot mount structure 278 which is hollowed out to have the upper chamber 279 and a lower chamber 280, the upper chamber being partly closed by the annular plug 281 and the lower chamber being closed by the plug 282. The lower chamber serves as a piston chamber to cooperate with the piston assembly 266 and function as a shock absorber or cushioning device. The king pin member 278 has both a sliding and rotating bearing connection with the sleeve 256 at 284 and within the sleeve 258 at 285.

The car is supported through the frame member 250, the tubular member 251 and the sleeve 252 by the shoulder 286 upon the spring 287 which spring extends downwardly within the sleeve 252 and the sleeve 251 to rest upon the thrust bearing 288 and the shoulder 289 of the knuckle sleeve 273. The lower portion of the spring 287 is provided with a closure 290 which extends upwardly inside of the tubular member 251 and the thrust bearing is also provided with a downwardly extending cup-shaped enclosure 291. The chamber 280 is maintained full of oil from the chamber 279 through the axial bore 293 and the radial bores 294 in the central rod member 263, such oil finding entrance into the lower compartment of the chamber through the sleeve 295 in the piston assembly 266. The rod 263 has a close fitting bearing at 296 in the king pin 278 and has a loose guide 297 in the upper plug 281 so that any oil inside of the upper sleeve bearing member 256 may seep down into the chamber 297 and flow through the bores 294 and 293 to the shock absorber chamber 280. The radial bores 298 and the axial bore 299 in the upper end of the king pin structure serve to vent the various passageways in the king pin and permit gravity flow down therethrough. The piston assemblage comprises a central bell-shaped member 300 with passageways 301 therein and with a flap valve 302 permitting upward flow through the passages 303 and with a spring seated valve 304 permitting downward flow through the passages 301, each of said valves preventing reverse flow.

The lubricant for the upper pivotal and sliding bearing 284 for the thrust bearing 283 and for the lower pivotal and sliding bearings 285 and also to replenish the shock absorber chamber 280 is preferably fed from a central lubricating system by the pipe 310 which has a flow metering or drip plug outlet 312 attached to the elbow fitting 313 into a boss 314 in the top of the tubular member 252. The lubricant will pass from the elbow fitting into the radial bore 315 and into a narrow annular chamber 316 from whence it rises through the bores 317 and 318 to the annular groove 319 in the top of the sleeve member 256. From this groove the lubricant will flow down the inner walls of the sleeve 256 to lubricate the upper slide and pivotal bearing 284 and some of it will be diverted to flow through the annular passage 297 to the upper compartment 279 of the king pin or pivotal mount from whence it flows to replenish the shock absorber.

The rest of the lubricant will pass through the bearings 284 and flow down around the upper portion of the pivotal mount 278 to lubricate the thrust bearing 283, and also will pass the thrust bearing through the bores 320 to lubricate the lower slide bearing. Any excess lubricant will collect inside of the chamber 258 and around the spring 259 until it reaches the top of the sleeve 260, whence it will overflow onto the road through the nipple 261.

In all of the constructions disclosed as in that of his copending application, Serial No. 39,415, filed June 25, 1925 and in Patents Nos. 1,755,626, 1,755,627 and 1,755,628, the lubricant is conveyed from the pressure source through pressure tight connections by way of drip plugs or other pressure absorbing outlets, the lubricant passing therebeyond without substantial pressure across one or more of the relatively loose swivel surfaces which permit the movement of the knuckle relative to the axle.

In all of the embodiments, also, he has utilized to the extent that this is applicable, the principles embodied in such copending application and patents and broadly claimed therein for preventing the blocking by air of lubricant flow to the bearings and for obviating a siphonic action.

For this purpose, the bores and pipes leading from the thrust bearing to the tie rod bearings may be provided with a relatively large diameter bore, sufficiently large to permit flow of lubricant about any air therein so that the lubricant will readily flow therethrough and no accumulation will take place therein, notwithstanding the fact that the upper end of the conduit may not be vented by reason of the relatively enclosed construction.

It will also be noted that the conduits leading to the drag link ball studs are also of large diameter as down to a level below that of the ball stud outlets to prevent air blocking, the conduits being, if desired, of much smaller diameter in the portion below the outlet in which lubricant is trapped.

In certain of the claims, he uses the term "control bearing" or "associated bearing" as applying to one of the bearings of the knuckle. This term defines generically any of the bearings at the knuckle such as the pivotal thrust, brake, tie rod and drag link bearings by which an operating adjustment on the knuckle or the wheel thereon is effected or transmitted from one to the other knuckle.

As many changes could be made in the above construction, and many apparently widely differenent embodiments of this invention could be devised without departing from the scope thereof, it is intended that all matter contained in the above description or shown in the accompanying drawings shall be interpreted as illustrative and not in a limiting sense.

The present application is a continuation in part of applications Serial No. 56,435 (now Patent No. 1,912,359) and Serial No. 58,704 (now Patent No. 1,862,513).

He claims:—

1. In a motor vehicle, in combination, an axle, a knuckle having a pivotal mount thereon, a thrust bearing at the lower end of said knuckle, a leak-proof container therefor, a lubricant inlet in said axle draining lubricant into said thrust bearing container and a passage leading lubricant in excess of that filling the thrust bearing container to another bearing on said knuckle.

2. In a motor vehicle, in combination, an axle, a knuckle having a pivot bearing thereat, a thrust bearing at the lower end thereof sustaining the weight of the axle upon the knuckle and exerting tension upon a part rigid with the knuckle, means effecting a leak-proof enclosure for said thrust bearing, a lubricant inlet carried by the axle disposed adjacent the knuckle pivot bearing and draining lubricant into the enclosure of said thrust bearing to fill the same, and a passage through which excess lubricant beyond that filling the thrust bearing enclosure passes to other bearings on the knuckle.

3. In a motor vehicle steering axle of the type including an axle beam having a clevis, a knuckle straddled by said clevis, a king pin rigidly fitted in said knuckle and bearing in the jaws of said clevis, and a thrust bearing encircling the lower end of the king pin and sustaining the axle beam upon the knuckle; the combination therewith of a bushing for the upper end of the king pin adjustably fitted in the upper clevis jaw and including a skirt encircling the upper end of the knuckle to render the connection dust-proof thereat, a lubricant inlet carried by the upper clevis jaw and leading into said upper bushing, said bushing having a passageway longitudinally thereof communicating with a bore in the upper face of the knuckle and enclosed within the dust-proof skirt, and piping draining said bore, carried by said knuckle and leading to a bearing thereof.

4. In a motor vehicle steering axle of the type including an axle beam having a clevis, a knuckle straddled by said clevis, a king pin rigidly fitted in said knuckle and having a bearing in the jaws of said clevis, and a thrust bearing encircling the lower end of the king pin and sustaining the axle beam upon the knuckle; the combination therewith of a bushing threaded into the upper clevis jaw and constituting a bearing for the upper end of the king pin, said bushing having a skirt telescoped over the upper end of the knuckle to form a dust-tight enclosure, a lubricant inlet carried by the upper clevis jaw, said bushing having a peripheral groove and a pair of longitudinal bores supplied from said groove and draining within said dust-proofing skirt into a corresponding pair of bores in the upper face of the knuckle, and conduits carried by said knuckle draining said bores and leading to bearings on said knuckle.

5. The combination set forth in claim 4 in which the upper end of the knuckle has arcuate grooves registering with the longitudinal bores of the upper bushing in all positions of steering adjustment of the knuckle.

6. In a motor vehicle steering axle of the type including an axle clevis, a knuckle having control bearings straddled by said clevis and having a king pin with a taper fit therein, a ball thrust bearing supported on the lower end of the king pin and sustaining the axle beam, a bushing threaded in the upper clevis jaw and having a double skirt therebelow straddling a corresponding annular ridge on the upper end of the knuckle and rendering the same dust proof, a lubricant inlet carried by the upper axle clevis jaw, and feeding lubricant through a bore therein to a groove about said bushing, a pair of longitudinal bores through said bushing draining lubricant to corresponding vertical bores from the upper face of the knuckle and supplied from said groove, said bores having arcuate grooves registering in all positions of steering adjustment with the longitudinal bores in the upper bushing, and pipes carried by the knuckle draining the bores therein and leading to said control bearings.

7. The combination set forth in claim 6 in which the king pin has an axial bore therethrough, leading lubricant to the ball thrust bearing and in which said bore is supplied from the groove about the bushing.

8. In a motor vehicle, in combination, an axle, a knuckle having a pivotal mount thereat, bearings carried by said knuckle, a pair of distinct conduits extending downward from near the upper end of said knuckle to said bearings, a lubricant inlet rigid with the axle and passing lubricant to said knuckle substantially free from pressure, and means rigid with the knuckle effecting a division of the admitted lubricant and delivering said lubricant in predetermined proportions to said conduits.

9. In combination, an axle having a socket at the end thereof, a knuckle having a pivot stud extending downward into said socket, a thrust bearing sustained on the lower end of said pivot stud and supporting said axle, an inlet fitting carried by a part rigid with said axle, a pair of restriction passages carried by said knuckle and supplied from said inlet, bearings associated with said knuckle and conduits carried by said knuckle connecting said restriction passages to said bearings.

10. In a motor vehicle, in combination, an axle having a socket at the end thereof, a knuckle having a body extending above said socket and including an integral stud bearing in said socket and extending downward therebelow, a thrust bearing supporting on the lower end of said stud and sustaining said axle, a dust-proofing enclosure encircling said stud substantially at the rim of said socket, means carried by a part rigid with said axle admitting lubricant to said knuckle, a pair of passages containing restriction pins in the body of said knuckle and in the path of lubricant delivered from said inlet, bearings associated with said knuckle and conduits carried by said knuckle connecting said passages containing restriction pins to said bearings.

11. In combination, an axle, a knuckle having a pivot member rigid therewith bearing in a part of said axle, a thrust bearing sustaining the axle upon the knuckle and enclosed to prevent loss of oil therefrom, means rigid with said axle to admit lubricant to the knuckle structure, a bearing associated with said knuckle, said structure having a cavity near the upper end thereof collecting lubricant from said inlet, a longitudinal bore through the pivot axis draining lubricant from said cavity to said enclosed thrust bearing, a longitudinal passage independent of said pivot axis draining lubricant from said cavity, and a conduit connected to the outlet of said passage and leading to said associated bearing.

12. In a motor vehicle, in combination, an axle, a knuckle having a pivot bearing thereat, a lubricant inlet on said axle and above said pivot bearing and delivering into a well thereabove, dividing means below said well and above said pivot bearing and draining lubricant therefrom and bearings carried by said knuckle and supplied from said dividing means.

13. In a motor vehicle, in combination, an axle having a bushing therein, a knuckle having an integral stud bearing in said bushing, a thrust bearing carried on the lower end of said stud and sustaining said axle, means closing said thrust bearing against leakage, control bearings carried by said knuckle, conduit means supplying lubricant to said thrust and said control bearings from a source on the axle, said means draining into a well at the upper end of the knuckle, a longitudinal bore axially through said stud draining lubricant from said well into said thrust bearing, and a pair of passages containing restriction pins draining said well and communicating with said conduit means to supply lubricant to said control bearings.

14. The combination set forth in claim 13 in which the lubricant is admitted to the well through a closure cap affixed to the knuckle and extending above the well with a dust-tight connection and in which a lubricant inlet fitting is carried by the closure cap.

15. In a motor vehicle, in combination, an axle having a bushing therein, a knuckle having a stud bearing in said bushing, a thrust bearing mounted on the lower end of said stud and sustaining said axle thereon, a cup enclosing said thrust bearing to prevent leakage of lubricant therefrom, a gasket enclosing said stud above said bushing to prevent the entry of dirt thereat, a bore axially through the stud leading to said thrust bearing, the overflow from said thrust bearing enclosure flowing to said bushing.

16. In a motor vehicle of the type having an axle end, a member having a vertical cylindrical opening rigidly connected to said axle end, a vertical pivotal element fitting in said opening in said member and having a bearing in said member and a steering knuckle attached to said vertical pivotal element, said member also including means to carry a vertical thrust, said last mentioned means being provided with a cup-like enclosure; the combination therewith of a lubricating installation for supplying lubricant to said bearing and to said cup-like enclosure including an inlet conduit along the axle, an inlet adjacent the upper part of said member from said inlet conduit and a plurality of lubricant conveying passageways, at least one of which extends vertically downwardly inside of said opening for conveying lubricant to said bearing and to said cup enclosure.

17. In a mechanism, in combination, an elongated element, a swinging structure carrying bearings having a vertical pivotal mount thereon, a thrust bearing at the lower end of said structure, a leak-proof container therefor, a lubricant inlet in said elongated element draining lubricant into said thrust bearing container and a passage leading lubricant in excess of that filling the thrust bearing container to another bearing on said structure.

18. In a mechanism, in combination, an elongated element, a swinging structure carrying bearings having a vertical pivot bearing thereat, a thrust bearing at the lower end thereof sustaining the weight of the elongated element upon the structure and exerting tension upon a part rigid with the structure, means effecting a leak-proof enclosure for said thrust bearing, a lubricant inlet carried by the elongated element disposed adjacent the structure pivot bearing and draining lubricant into the enclosure of said thrust bearing to fill the same, and a passage through which excess lubricant beyond that filling the thrust bearing enclosure passes to other bearings on the structure.

19. In a mechanism of the type including an elongated element having a clevis, a swinging structure carrying bearings straddled by said clevis, a vertical pivot mount rigidly fitted in said structure and bearing in the jaws of said clevis, and a thrust bearing encircling the lower end of the vertical pivot mount and sustaining the elongated element upon the structure; the combination therewith of a bushing for the upper end of the vertical pivot mount adjustably fitted in the upper clevis jaw and including a skirt encircling the upper end of the structure to render the connection dust-proof thereat, a lubricant inlet carried by the upper clevis jaw and leading into said upper bushing, said bushing having a passageway longitudinally thereof communicating with a bore in the upper face of the structure and enclosed within the dust-proofed skirt, and piping draining said bore, carried by said structure and leading to a bearing thereof.

20. In a mechanism of the type including an elongated element having a clevis, a swinging structure carrying bearings straddled by said clevis, a vertical pivot rigidly fitted in said structure and having a bearing in the jaws of said clevis, and a thrust bearing encircling the lower end of the vertical pivot mount and sustaining the elongated element upon the structure; the combination therewith of a bushing threaded into the upper clevis jaw and constituting a bearing for the upper end of the vertical pivot mount to form a dust-tight enclosure, a lubricant inlet carried by the upper clevis jaw, said bushing having a peripheral groove and a pair of longitudinal bores supplied from said groove and draining within said dust-proofing skirt into a corresponding pair of bores in the upper face of the structure, and conduits carried by said structure draining said bores and leading to bearings on said structure.

21. The combination set forth in claim 20 in which the upper end of the structure has arcuate grooves registering with the longitudinal bores of the upper bushing in all positions of the structure.

22. In a mechanism of the type including a clevis, a swinging structure carrying bearings having control bearings straddled by said clevis and having a vertical pivot mount with a taper fit therein, a ball thrust bearing supported on the lower end of the vertical pivot mount and sustaining the clevis, a bushing threaded in the upper clevis jaw and having a double skirt therebelow straddling a corresponding annular ridge on the upper end of the structure and rendering the same dust-proof, a lubricant inlet carried by the upper clevis jaw, and feeding lubricant through a bore therein to a groove about said bushing, a pair of longitudinal bores through said bushing draining lubricant to corresponding vertical bores from the upper face of the structure and supplied from said groove, said bores having arcuate grooves registering in all positions with the longitudinal bores in the upper bushing, and pipes carried by the structure draining the bores therein and leading to said control bearings.

23. In combination with mechanism of the type including a vertical bearing structure comprising an external encircling bearing element and an internal encircled bearing element, each connected to frame components of said mechanism, the former elements carrying at its lower end a cup-like enclosure and thrust means in said enclosure to take up vertical thrust between said elements; a lubricating installation for feeding excess quantities of lubricant to said bearing structure and means for conducting the excess of said lubricant to said cup-like enclosure to maintain said thrust means immersed in lubricant.

GEORGE BIJUR,
*Executor of the Estate of Joseph Bijur, Deceased.*